Patented Dec. 15, 1931

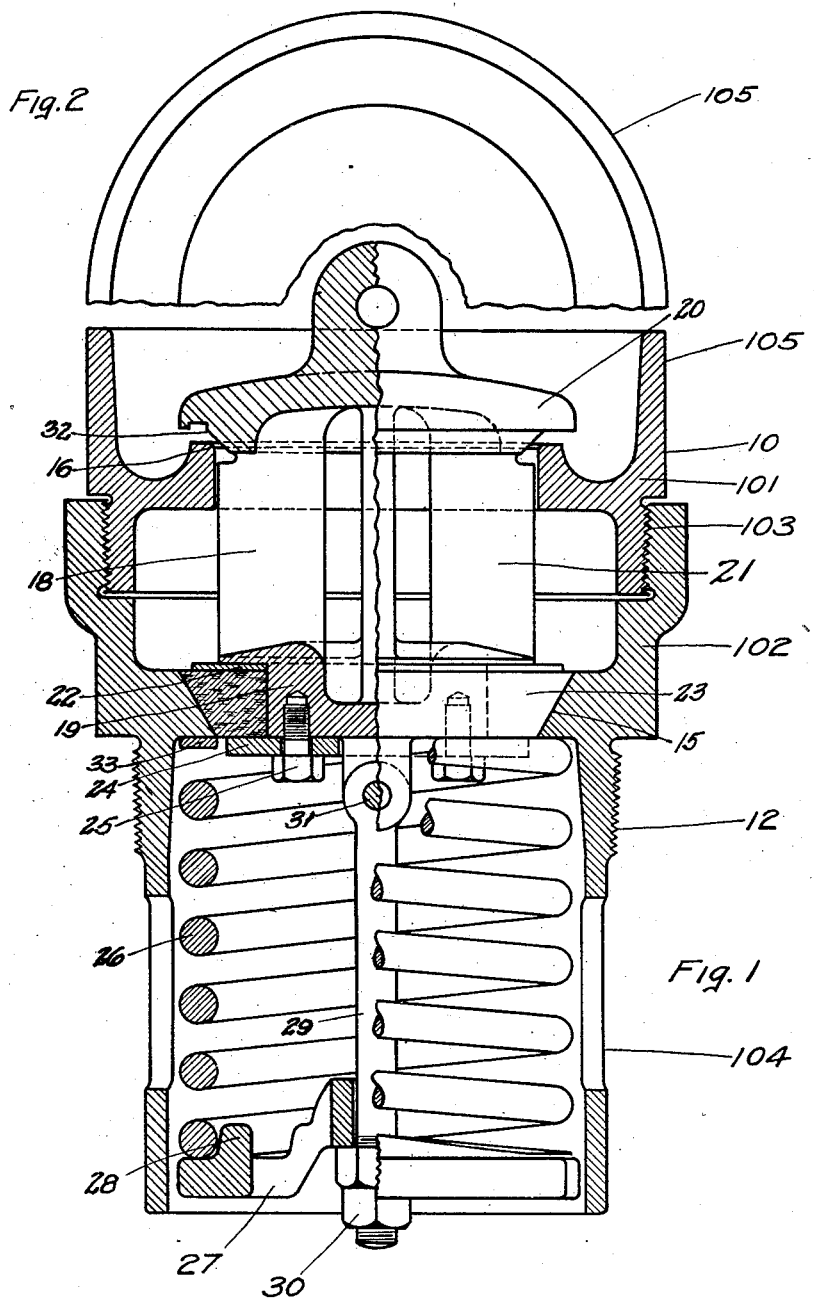

1,836,343

UNITED STATES PATENT OFFICE

ABRAM E. SMITH, OF CHICAGO, ILLINOIS, ASSIGNOR TO UNION TANK CAR COMPANY, OF CHICAGO, ILLINOIS, A CORPORATION OF NEW JERSEY

SAFETY VALVE

Application filed May 18, 1928. Serial No. 278,692.

I have illustrated a safety valve embodying my invention, and shall describe the same as applied to a tank car in connection with which it is particularly useful, although it is, of course, understood that my invention is not limited to this application.

My invention will best be understood by reference to the accompanying drawings, in which I have illustrated one embodiment thereof, and in which Fig. 1 is a vertical section through a safety valve embodying my invention, and Fig. 2 is a partial plan view.

Like reference characters indicate like parts throughout the drawings.

Referring now to the drawings, 10 is a valve casing here illustrated as comprising an upper section 101 and a lower section 102 screwed together as at 103. The casing is provided with exterior screw threads 12 which are adapted to engage screw threads not illustrated in a dome of a tank car or any suitable portion of a receptacle.

The valve casing 10 is provided with a main valve seat 15, preferably tapered upwardly and outwardly, and with an auxiliary valve seat 16 located above and spaced therefrom. The valve casing is preferably provided with a portion 104 extending downwardly into the container, and with a peripheral top flange 105, for the purpose of directing the flow of gas, steam or liquid from the safety valve, upwardly.

A valve member 18 is preferably provided with a lower section or head 19, and an upper section or head 20 spaced therefrom and connected thereto by a plurality of ribs 21 preferably extending radially as illustrated. The lower section 19 of the valve member is provided with a peripheral recess 22, in which is received an annular gasket or valve 23 formed of resilient material such as cork or the like. The valve 23 is tapered upwardly and outwardly and is adapted to engage the main valve seat 15. The gasket or valve 23 is secured in position by means of a retaining plate 24 which engages the underside of the valve 23, and is in turn held in position by bolts 25. The valve 23 is normally held against its seat 15 at the normal pressures in the container by a coil spring 26, the upper end of which engages the casing as at 33, while the lower end thereof engages a spider or member 27 preferably provided with upwardly extending lugs 28 for positioning the coil spring.

The member 27 is secured to the lower end of an arm or link 29 by suitable nuts 30. The arm 29 is pivoted to the valve casing as at 31. It will be noted that the lower skeleton portion 104 of the casing serves as a protection and guide for the member 27 and the parts associated therewith.

The upper section 20 of the valve member is preferably provided with an auxiliary valve 32 which is adapted to engage the metal seat 16 under emergency conditions.

The type of safety valve which has commonly been used and which comprises a metal valve engaging a metal seat, is not entirely satisfactory, for the reason that the valve seat, in practice, is exposed to the atmosphere and becomes corroded, thereby having a tendency to cause leakage at the valve at pressures as low as 5 lbs. where the safety valve is intended to operate at pressures of, say, 25 lbs. Such leakage has resulted in causing considerable loss in the lading.

The safety valve embodying my invention, and comprising a resilient valve or gasket engaging a valve seat, overcomes the foregoing difficulties. At the same time, a valve formed in the manner described will eventually wear out, and in order to provide a safety valve which will operate at the desired pressure on failure of the main resilient valve, I have provided the auxiliary metal valve at the upper portion of the valve member and which engages the metal valve seat when the main resilient valve becomes so badly worn as to be inoperative. When this occurs, the resilient valve will, of course, be renewed. The failure, however, may occur at a time when it is inconvenient or impossible to renew the resilient valve at the time, and the auxiliary relief valve will then become operative until such time as the main resilient valve is renewed. Furthermore, I have combined the main resilient valve with an auxiliary valve of the type that is at present used, thereby preserving the advantages of the present safety valve.

By making the valve casing 10 in two sections, it is possible to make the diameter of the valve member 23 of greater diameter than the opening in the upper part of the valve casing, and of greater diameter than would otherwise be possible. The parts are assembled by placing the valve member 18 in the opening in the upper portion 101 of the valve casing, then applying gasket 23, retaining plate 24 and bolts 25, and then screwing the section 101 of the valve casing into the section 102. The parts are so proportioned that when the valve 23 is in its raised position, there will be a full flow opening between the greatest diameter of the resilient gasket and the inside diameter of the housing just above the valve seat. In other words, when the gasket 23 is in its raised position, there should be a flow area between the gasket 23 and the section 102 of the valve casing as great as the opening between the valve and its valve seat.

I claim:

1. In a safety valve adapted to be attached to a container, a valve casing provided with two spaced valve seats, a valve member provided with a first valve formed of resilient material adapted to engage one of said seats, and a second valve adapted to engage the other of said seats, said second valve being normally open and unseated when said first valve is seated but adapted to seat when said resilient material becomes worn.

2. In a safety valve adapted to be attached to a container, a valve casing provided with two spaced valve seats, a valve member provided with a first valve formed of non-metallic resilient material adapted to engage one of said seats, and a second metallic valve adapted to engage the other of said seats, said second valve being normally open and unseated when said first valve is seated but adapted to seat when said resilient material becomes worn.

3. In a safety valve adapted to be attached to a container, a valve casing provided with two spaced valve seats, a valve member provided with a first valve formed of resilient material adapted to engage one of said seats, a second valve adapted to engage the other of said seats, said second valve being normally open and unseated when said first valve is seated but adapted to seat when said resilient material becomes worn, and mechanical means for holding said first valve against its seat with a predetermined pressure.

4. In a safety valve adapted to be attached to a container, a valve casing provided with two spaced valve seats, a valve member provided with a first valve formed of non-metallic resilient material adapted to engage one of said seats, a second valve adapted to engage the other of said seats, said valves being of substantially equal areas, and said second valve being normally open and unseated when said first valve is seated but adapted to seat when said resilient material becomes worn.

5. In a safety valve adapted to be attached to a container, a valve casing provided with two spaced valve seats, a valve member having ribs forming a skeleton structure and provided with a first valve formed of resilient material adapted to engage one of said seats, a second valve adapted to engage the other of said seats, said second valve being normally open and unseated when said first valve is seated but adapted to seat when said resilient material becomes worn, and means for normally holding said first valve against its seat, but permitting it to open at a predetermined pressure in the container.

6. In a safety valve adapted to be attached to a container, a valve casing provided with two spaced valve seats, a valve member having ribs forming a skeleton structure and provided with a first valve formed of resilient material adapted to engage one of said seats, a second valve adapted to engage the other of said seats, said second valve being normally unseated when said first valve is seated but adapted to seat when said resilient material becomes worn, and means for normally holding said first valve against its seat, but permitting it to open at a predetermined pressure in the container, said ribs engaging the valve casing and forming guides for seating said valves.

7. In a safety valve adapted to be attached to a container, a valve casing provided with two spaced valve seats one of which is upwardly and outwardly flared, a valve member provided with a first valve formed of resilient material conforming in contour to said seat adapted to engage the same, and a second valve adapted to engage the other of said seats, said second valve being normally open and unseated when said first valve is seated but adapted to seat when said resilient material becomes worn.

8. In a safety valve adapted to be attached to a container, a valve casing provided with two spaced valve seats, a valve member provided with a first valve formed of resilient material adapted to engage one of said seats, and a second valve adapted to engage the other of said seats, said second valve being normally open and unseated when said first valve is seated, said second valve being open to the atmosphere.

9. In a safety valve adapted to be attached to a container, a valve casing provided with two spaced valve seats, a valve member provided with a first valve formed of resilient material adapted to engage one of said seats, a second valve adapted to engage the other of said seats, said second valve being normally open and unseated when said first valve is seated, means for seating said valves comprising a device attached to said valve member, and a member interposed between said valve casing and said device and urging said valves toward their seats.

ABRAM E. SMITH.